United States Patent [19]

Kimura et al.

[11] Patent Number: 4,649,399
[45] Date of Patent: Mar. 10, 1987

[54] PEN RECORDER

[75] Inventors: Toshio Kimura; Shuichi Nakagawa; Teruhiko Tokumo; Hiroyuki Yamamoto; Hiroshi Kotan; Hiroshi Otsu; Tetsuya Satoh, all of Tokyo, Japan

[73] Assignee: Yokogawa Hokushin Electric Corporation, Tokyo, Japan

[21] Appl. No.: 835,166

[22] Filed: Mar. 3, 1986

[30] Foreign Application Priority Data

Nov. 8, 1985 [JP] Japan .................... 60-250114

[51] Int. Cl.⁴ .................... G01D 9/04; G01D 7/04
[52] U.S. Cl. .................... 346/32; 310/268; 318/663; 340/754; 346/17; 346/50; 346/139 B; 346/145

[58] Field of Search .................... 346/17, 32, 49, 50, 346/139 B, 145; 324/100; 340/870.43, 754, 753; 318/663, 666; 310/268

[56] References Cited

U.S. PATENT DOCUMENTS

| | | | |
|---|---|---|---|
| 3,787,828 | 1/1974 | Hasebe | 346/32 X |
| 4,091,389 | 5/1978 | Fujita | 346/32 |
| 4,214,250 | 7/1980 | Fujita | 346/145 |

Primary Examiner—Joseph W. Hartary
Attorney, Agent, or Firm—Moonray Kojima

[57] ABSTRACT

An automatically balancing type pen recorder, which is compact in size and is highly reliable in operation, comprises an integral servo unit formed of a single printed circuit board which incorporates therein a pen carriage and an automatic balancing mechanism adapted to move a recording chart in a direction perpendicular to the direction of feed of the chart, in response to the magnitude of a measuring signal.

10 Claims, 19 Drawing Figures

FIG.15

| Recording sheet feed x (mm/h) | Number of data D | Record data |
|---|---|---|
| 2880 ≤ x | 0 ~ 1 | Real time |
| 576 < x < 2880 | 1 ~ 5 | Average |
| 288 < x ≤ 576 | 5 ~ 10 | Average ↓ Minimum value ↓ Average ↓ Maximum value ↓ Average |
| 192 < x ≤ 288 | 10 ~ 15 | |
| 144 < x ≤ 192 | 15 ~ 20 | |
| 115.2 < x ≤ 144 | 20 ~ 25 | |
| 96 < x ≤ 115.2 | 25 ~ 30 | |
| 82.3 < x ≤ 96 | 30 ~ 35 | |
| 72 < x ≤ 82.3 | 35 ~ 40 | |
| x ≤ 72 | 40 ~ | |

PEN RECORDER

BACKGROUND OF THE INVENTION

1. Field of Invention.

This invention relates to an automatic balancing type pen recorder having a servomechanism.

2. Discussion of the Prior Art.

Pen recorders are known and are used in analog recording of various measurement signals. For example, FIG. 1 shows a conventional automatic balancing type pen recorder, wherein a chart cassette 1 houses a recording chart 2 and is adapted to be detachably mounted on a main body chasis(not shown). A pen carriage 3, upon which is detachably mounted a pen 4, is slidably fit over a guide shaft 5 extending in a direction perpendicular to the direction of feed of chart 2. A driving system 6 causes reciprocal movement of pen carriage 3 along its guide shaft 5 which is driven by a servomotor 7. A potentiometer 8 feeds back the position of the pen carriage 3. Servomotor 7 and potentiometer 8 constitute a servo unit which is connected through lead wires 9,10 and connectors 11,12 to a base circuit board 13 which in turn is connected to a servo amplifier board 14 and a preamplifier board 15.

Conventional pen recorders of this type use a plurality of lead wires and connectors. Thus, it is difficult to obtain high packing density. Also, such conventional pen recorders are prone to failure due to unsatisfactory connections and disconnections.

Furthermore, in order to manufacture a recorder utilizing a plurality of pens (so called multi-pen recorder), each pen recording system therein must be provided with a separate servo unit of the type shown in FIG. 1. Thus, considerably large installation space is required, and accordingly a compact size multi-pen recorder is difficult to obtain.

Moreover, a conventional pen recorder is not provided with mechanism for printing predetermined print patterns, such as feed rate of the recorder chart, date of measurement, time of measurement, alarm information, time marker, etc, which are usually associated with the recording of measurement signals. Thus, the described recorder cannot conveniently analyze recorded data.

In addition, the conventional recorder reads out the measurement signal from the position of the pen carriage and records same on the chart. Thus, it is difficult to obtain a complete picture of the measured data. This defect is pronounced especially in a multi-pen recorder, wherein measurement results are recorded on the chart by correcting or adjusting time differences corresponding to the distances between adjacent pens disposed in the direction of feed of the chart.

SUMMARY OF THE INVENTION.

Accordingly, an object of the invention is to overcome the aforementioned defects and deficiencies of the prior art.

Another object is to provide a pen recorder which is compact in size, has high packing density, is highly reliable and dependable in operation, is inexpensive to manufacture, and is easy to maintain and operate, and is adapted to be converted into a multipen recorder.

BRIEF DESCRIPTION OF DRAWINGS.

FIG. 15 is a chart depicting the relatioship between feed rate and number of measured data in the recorder of FIG. 12.

DETAILED DESCRIPTION OF PREFERRED EMBODIMENTS.

Figure 1:
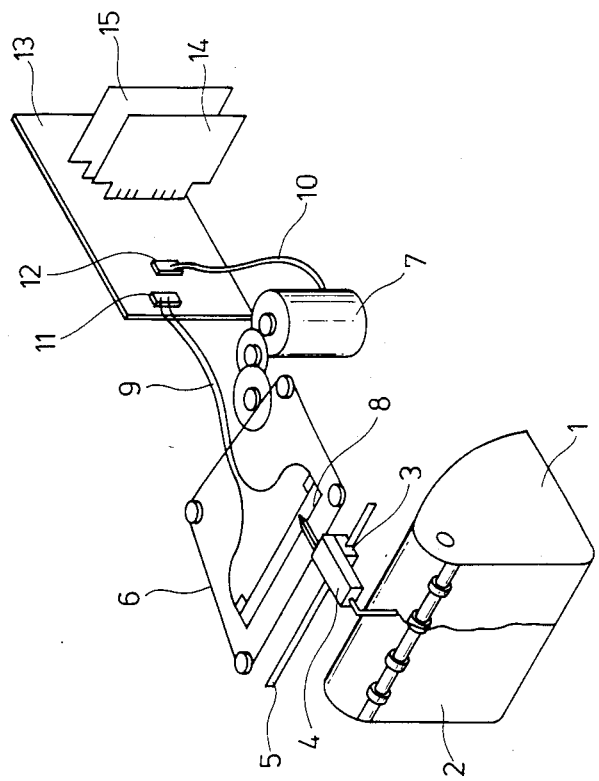
FIG. 1 is a schematic view depicting a conventional pen recorder.
Figure 2:
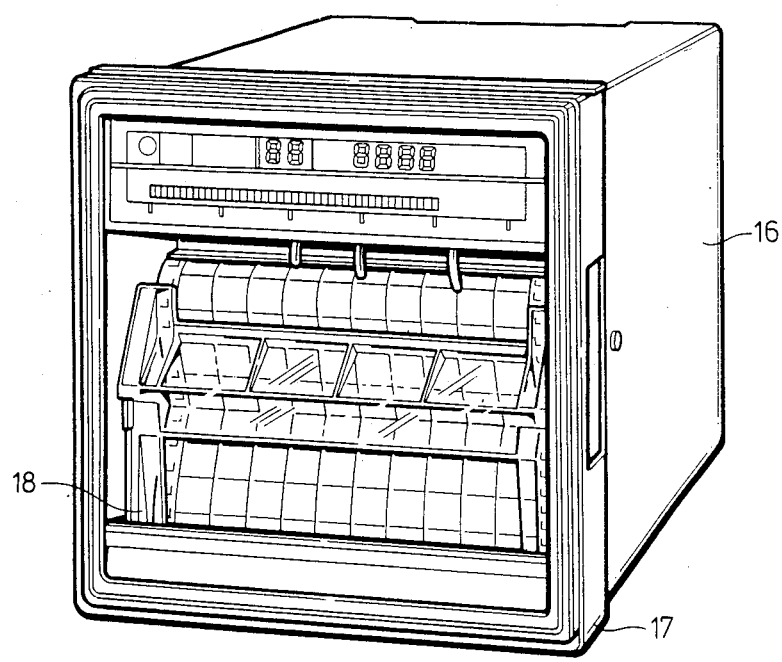
FIG. 2 is a perspective view depicting an illustrative embodiment of the invention.
Figure 3:
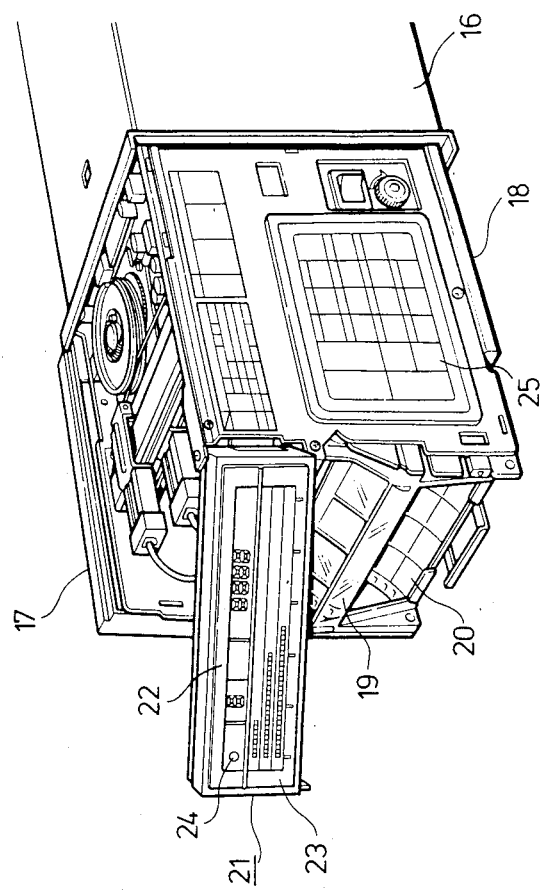
FIG. 3 is a perspective view depicting inner components of the embodiment of FIG. 2.
Figure 4:
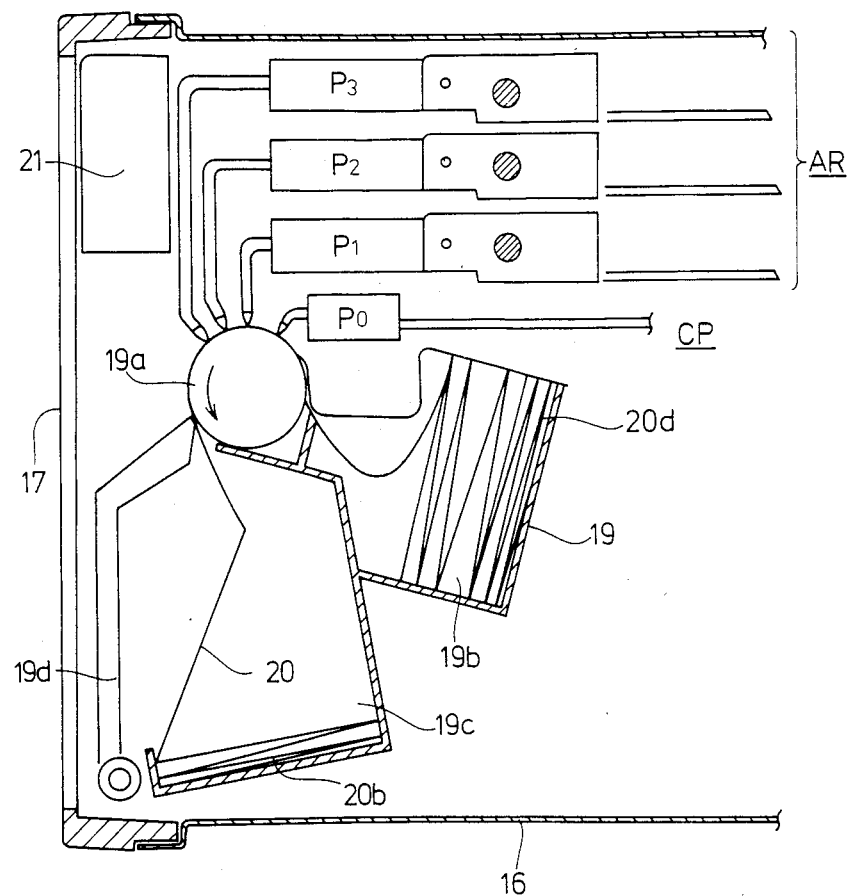
FIG. 4 is a schematic vertical sectional view depicting the embodiment of FIG. 2.
Figure 5:
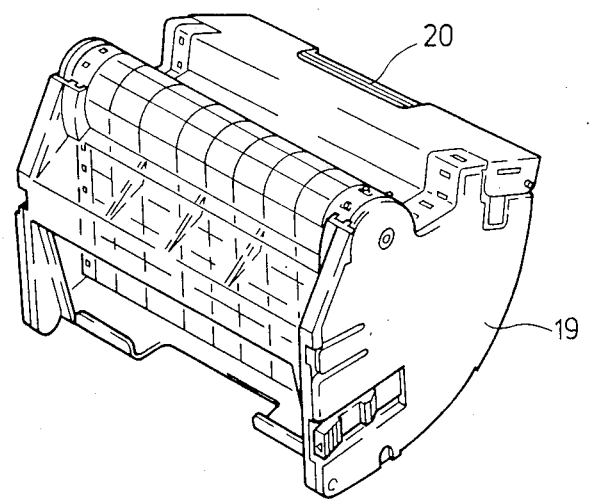
FIG. 5 is a perspective view depicting a chart cassette used in the embodiment of FIG. 2.

Referring to FIGS. 2,3,4, a box shaped case 16 has a front end which is opened and closed by door 17, and houses an interior assembly 18 so that assembly 18 can be removed from case 16. A chart cassette 19, housing a recording chart 20, is detachably mounted on the lower front portion of assembly 18.(see FIG. 5).

The cassette 19 comprises a cylindrical platen 19a, around which is disposed chart 20 and which is rotatable, a first chart storage 19b, which houses a fresh recording chart, and a second chart storage 19c, which is formed integral with first chart storage 19b and receives therein the recorded chart. Cassette 19 further comprises a pressure member 19d, for guiding recorded chart 20b from platen 19a, to second chart storage 19c. The lower end of pressure member 19d is pivoted so that the upper end thereof is in opposed relationship with plate 19a and is spaced apart therefrom by a suitable distance.

Figure 6:
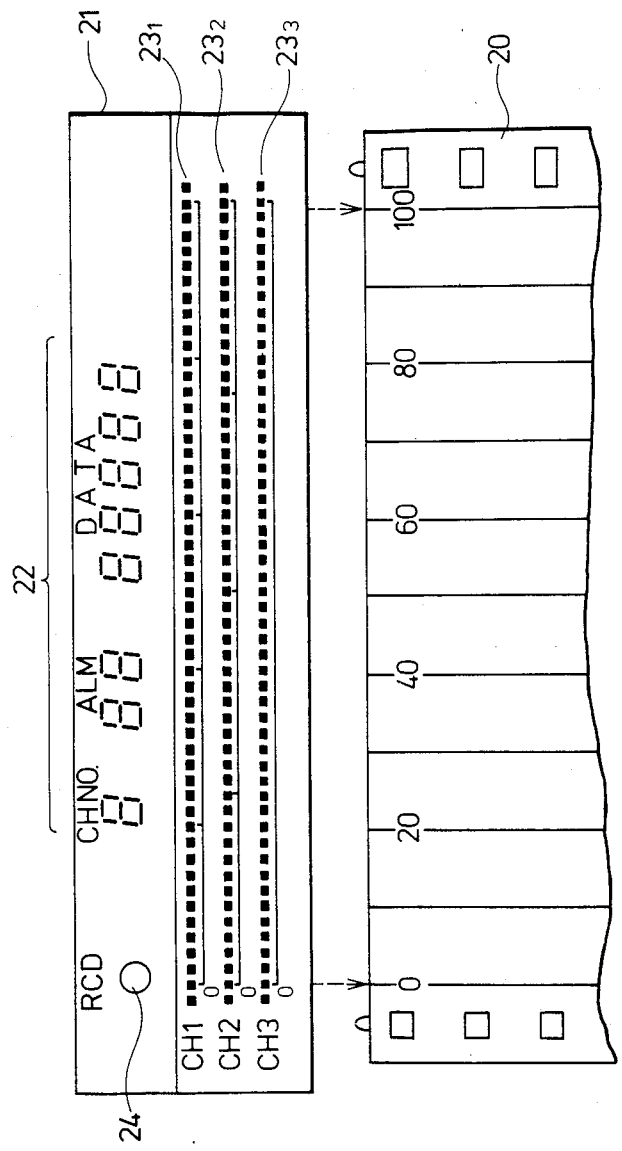
FIG. 6 is a perspective view depicting a display unit used in the embodiment of FIG. 2.

A display unit 21 is attached to the upper portion of assembly 18 in such a manner that unit 21 is rotatable in a direction opposite to the direction in which door 17 is rotated. As shown in FIG. 6, display unit 21 has digital display devices for digitally displaying measurement conditions, measured data and a level of alarm signal set and three bar graph display devices $23_1$–$23_3$, for displaying magnitudes of measured and alarm signals, obtained from the operational systems of three pens $P_1$–$P_3$, in the form of bar graphs, in the widthwise direction of and within the effective width of chart 20. Display unit 21 further comprises a display element 24 for displaying the recording mode or alarm mode. The colors of the bar graphs displayed by bar graph displaying devices $23_1$–$23_3$ are the same as those (for example, red, blue and green) of ink applied to chart 20 by pens $P_1$–$P_3$, respectively.

An operating unit 25 (see FIG. 3) for setting measurement conditions is attached to one side wall of assembly 19. When setting measurement conditions, an operator rotates display unit 21 until it is in a coplanar relationship with operating unit 25, and sets measurement conditions while watching the display devices 22.

Pens $P_1$–$P_3$ are arranged one over the other as an analog recording mechanism AR (see FIG. 4) above platen 19a. A pen $P_0$ is used to record a desired pattern on recording chart 20 and is disposed as a printing mechanism CP below analog recording mechanism AR.

Figure 7:
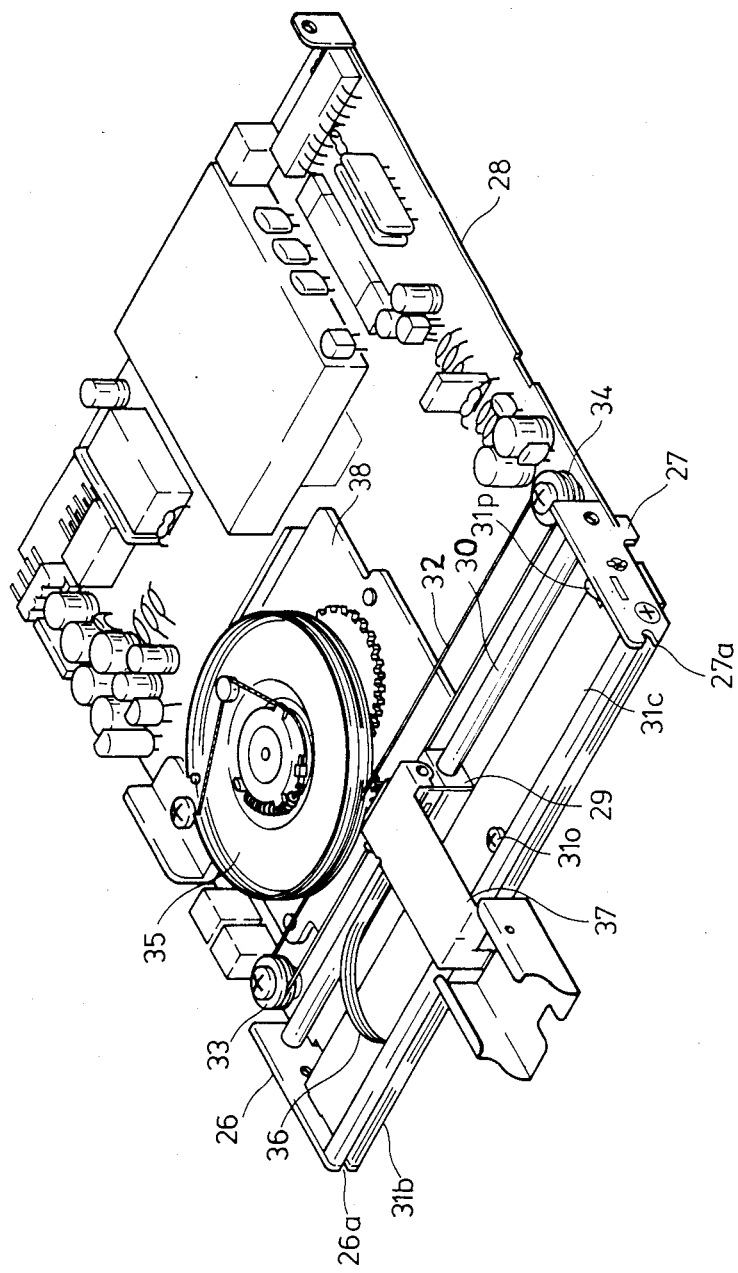
FIG. 7 is a perspective view of a servo unit used in the embodiment FIG. 2.
Figure 8:
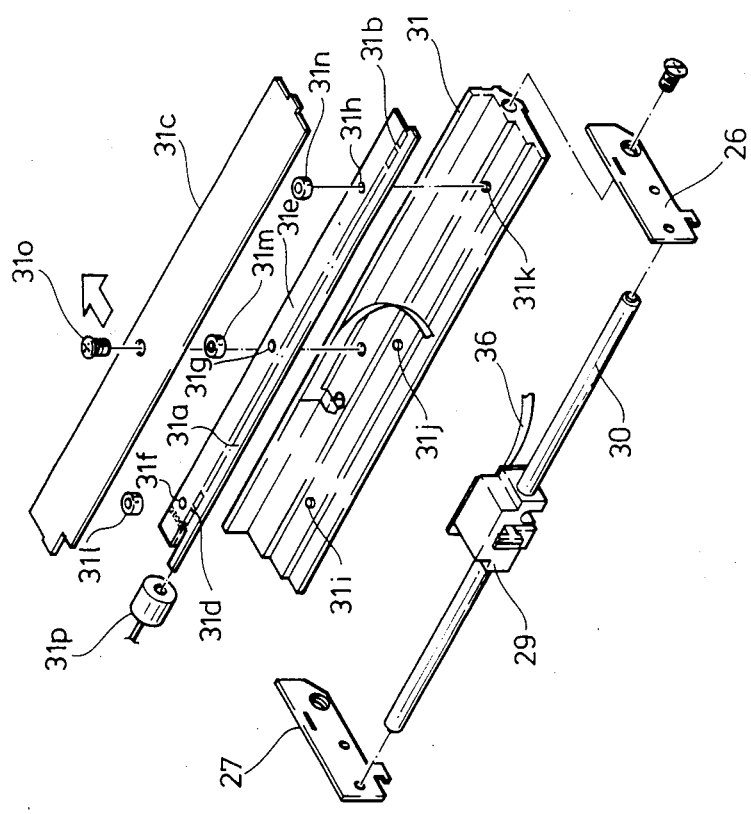
FIG. 8 is an exploded perspective view depicting a magnetorestrictive potentiometer used in the servo unit of FIG. 7.

Referring to FIGS. 7,8, brackets 26,27, which are of the same shape, are attached to the front (lef) ends, respectively of the sides of a printed circuit board 28. A guide shaft 30, for guiding a pen carriage 29, is supported by brackets 26,27. A sheet like magnetorestrictive wire 31a, of a magnetorestrictive potentiometer 31, is extended flat over the surface of a mounting member 31e, in parallel with the direction in which carriage 29 is shifted. A protective plate 31c is provided to protect the sheet like magnetorestrictive wire 31a. The magnetorestrictive member 31a is formed to be integral with a mounting member 31e through a plurality of connecting members 31d. Mounting member 31e has a circular mounting hole 31f and elliptical mounting holes 31g and 31h. When mounting wire 31a over mounting member 31b, pins $31_i$–$31_k$ extending from a stepped portion of member 31b, are fit into holes 31f–31h, respectively, and are further fit with elastic ring shaped pads $31_l$–$31_n$, respectively.

Thereafter, protective cover plate 31c is disposed over magnetorestrictive wire 31a and the ends of plate 31c are fit into the rectangular holes, respectively, of bracket 26,27, while the center portion of plate 31c is securely attached to member 31b with a screw 31o. Sheet like wire 31a has a driving coil 31p at one end thereof. Thus, wire 31a is mounted on mounting member 31b in such a manner that the former can be extended or contracted in the lengthwise direction. It is prevented from being bent in the direction of the thickness of the plate and from being distorted due to temperature variations, whereby a potentiometer having excellent characteristics is obtained.

Guide pulleys 33,34 (see FIG. 7), around which a driving string 32 is wrapped, are disposed adjacent to bracket 26,27, respectively. The front ends of brackets 26,27 have U-shaped grooves 26a, 27a, respectively, which serve to determine the position of the servo unit, when the unit is attached to the inner frame of the recorder.

Pen carriage 29 is reciprocated by driving string 32 wrapped around guide pulleys 33,34 and guide shaft 30 is extended through the center portion of carriage 29. One portion, at one end of pen carriage 29, is engaged with part of member 31b so that carriage 29 is movable along guide shaft 30. A detecting coil (not shown) of magnetorestrictive potentiometer 31 is mounted on carriage 29 in opposed relation with wire 31a and is electrically connected through a flexible printed circuit board 36 to board 28.

A pen holder 37 is rotatably mounted on carriage 29 and a pen (not shown) is detachably attached to holder 37. A motor (only a plate 38 thereof which establishes a magnetic circuit of the motor is shown in FIG. 7), a motor driver, a preamplifier for amplifying a measurement signal and a servo amplifier for obtaining a difference signal in response to the position feedback signal from potentiometer 31 and in response to the output signal derived from the preamplifier, are mounted on board 28 to serve as a servo unit. The arrangement is thus of unitary construction.

Figure 9:
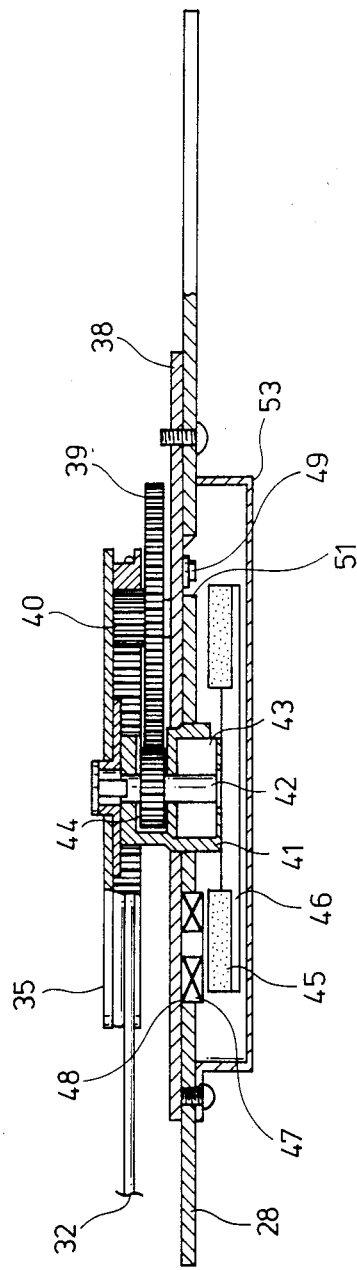
FIG. 9 is an elevational cross sectional view depicting a servomotor used in the servo of FIG. 7.

FIG. 9 is an elevational cross sectional view of a motor for driving pulley 35. Yoke plate 38, which also serves as a chassis, is mounted on one major surface of printed circuit board 28. Pulley 35 and intermediate gears 39,40 are also mounted on the same surface of board 28. Driving string 32 is wrapped around driving pulley 35, which has internally threaded gear teeth in mesh with intermediate gear 40 in order to transmit rotation of the motor.

A boss 41 is extended through printed circuit board 28 and yoke plate 38. One end of boss 41 extends beyond plate 38 in the form of a bearing for supporting pulley 35. The other end of boss 41 is terminated into a mounting portion for mounting a bearing 43 of a rotor shaft 42. An aperature is formed through the cylindrical wall of boss 41, extending beyond yoke plate 38, adjacent to one end of plate 38 for permitting an output gear 44, carried by one end of rotor shaft 42, to mesh with intermediate gear 39.

A rotor 46, having a plurality of circumferentially spaced magnets 45, is attached to the other end of shaft 42. It should be noted that the portions adjacent to the magnetically neutral points of rotor 46 are reduced in thickness so that rotor 46 becomes light in weight. As a result, the rotor 46 has a low moment of inertia and consequently its response is increased. Thus, the servomotor has an attractive response time characteristic.

The board 28 is formed with a plurality of mounting holes 48, into which are fit a plurality of armature coils 47, respectively, and two further mounting holes 51,52 (52 is not shown), into which are inserted Hall elements 49,50 (50 is not shown), in such a manner that they are angularly spaced from each other by an electrical angle of 90°. Printed circuit board 28 is further formed with a plurality of mountng holes (not shown) for mounting component parts of a semiconductor integrated circuit, which comprises the motor driver circuit and uses plate 38 as a heat sinke. Rotor 46 is protected by cover 53.

Thus, the motor is in the form of a flat brushless DC motor and the distance or height between driving pulley 35 and cover 53 is decreased and the installation space for mounting the motor, including a reduction gear, is reduced. Consequently, the space required for the installation of various components, including the motor driver circuit, is reduced. Thus, when the inventive motor is used, the servo unit is thin as a whole and is compact in size.

Figure 10:
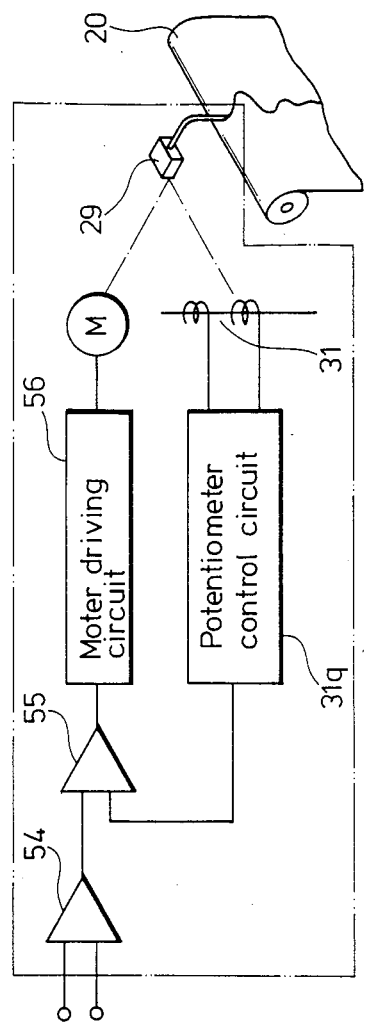
FIG. 10 is a block diagram depicting the servo unit of FIG. 7.

In FIG. 10, the servo unit is shown in block diagram form comprising a potentiometer control circuit 31q, a preamplifier 54, a servoamplifier 55, a motor driver circuit 56, and a motor M. The components enclosed by the two dot chain lines are integrally incorporated in printed circuit board 28.

Pen carriage 29 is shifted through operation of an automatic balancing mechanism comprising servoamplifier 55, motor M and potentiometer 31, in a direction perpendicular to the direction of feed of chart 20 in response to the magnitude of a measurement signal applied to preamplifier 54. Thus, analog data, representative of the magnitude of the measurement signal, is recorded on chart 20.

Advantageously, most of the components are directly soldered to the printed circuit board so that the packing density is considerably increased. Consequently, the inventive pen recorder is compact in size and the number of fabrication steps is reduced.

Furthermore, the failure involving lead wires and connectors prevalent in the conventional recorders are eliminated by the invention so that a high degree of reliability is assured. In addition, the operation of the servo unit can be checked for defects, as a single unit, so that inspection and maintenance is simplified and facilitated Moreover, the inventive servo units are completely interchangeable so that when manufacturing a multi-pen device, it is only necessary to put together a plurality of the units. Thus, mass production is feasible and fabrication costs are substantially reduced. Furthermore, the assembly of the servo unit with the main body frame can be advantageously accomplished by inserting the servo unit at a predetermined position. Thus, as compared with conventional priorart multi-pen recorders, the invention simplifies the fabrication process by using the same number of steps for single or multiple pen arrangements.

The motor and other components are shown to be mounted on a common circuit board. However, it is to be understood that a portion of the board, upon which is mounted the motor, may be cut off and after the motor is mounted on the cut off portion, the latter may be fit with the printed circuit board and the motor may be electrically connected to the components mounted on the remaining part of the board by soldering or the like. Thus, it is possible to assemble and adjust only the motor, which can thus be easily replaced.

Figure 11:
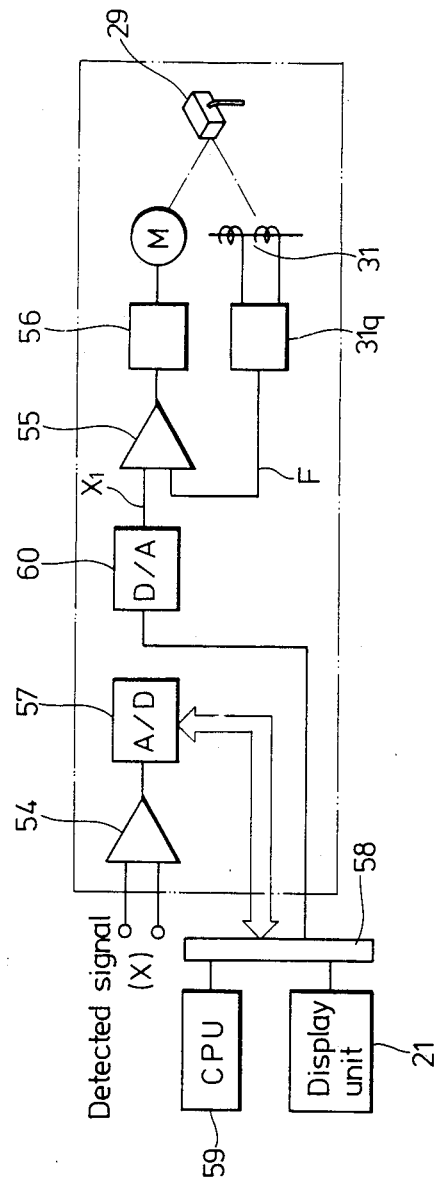
FIG. 11 is a block diagram depicting another servo unit.

In FIG. 11 the measurement signal is converted into a digital signal and then applied to the servo system under control of a microprocessor. The measurement signal is applied through a preamplifier 54 to a A/D converter 57 to be converted into a digital signal. The digital output signal from A/D converter 57 is applied through a bus 58 to a central processing unit, such as a microprocessor, CPU 59, which executes a predetermined arithmetic operation. The digital output signal from CPU 59 is applied through bus 58 to a D/A converter 60 to be converted into an analog signal X1. Thus, the servo unit effects automatic balancing in response to the output analgo signal derived from the D/A converter 60 so that when the pen is recording, the operation for correcting the time axis between adjacent pens are carried out so that the analog recording, without accompanying the phase difference on the time axis, can be attained.

When analog recording is done without accompanying the phase difference of the time axis between the adjacent pens, in general, the magnitude of the measurement signal to be applied to the servosystem is converted into a digital signal at a frequency associated with the feed rate of the chart. Thus, the measurement frequency varies in response to the feed rate of the chart, so that it become impossible to measure at a predetermined frequency. Especially when the feed rate of the chart is decreased, the sampling frequeny of measurement signals becomes longer so that it becomes difficult to monitor the recorded data. To overcome such problem, the measurement signals derived from a plurality of systems, are converted into digital signals at a predetermined frequency independent of the feed rate of the chart, and are applied to the servosystems, respectively, under control of CPU 59.

Figure 12:
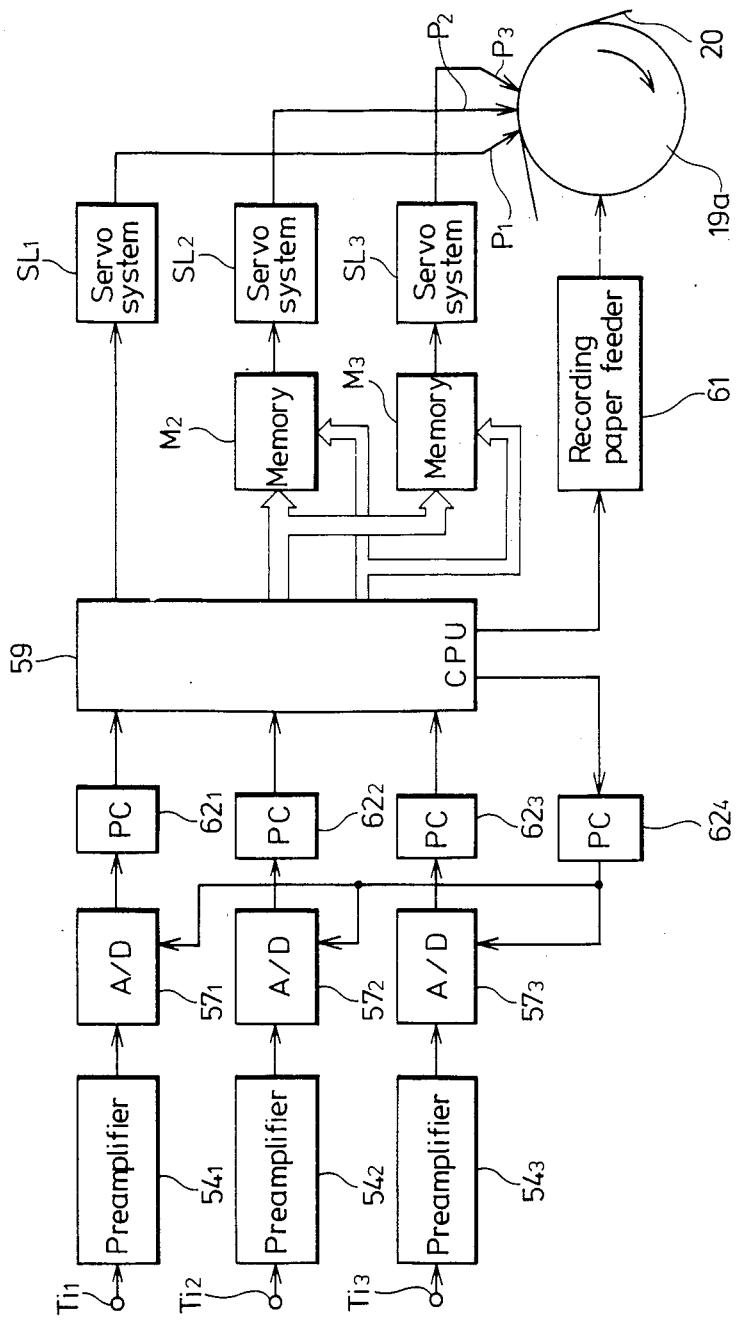
FIG. 12 is a block diagram depicting another illustrative embodiment utilizing three pens in a recorder arrangement.

Referring now to FIG. 12, recording pens $P_1$-$P_3$ are arranged in parallel with the direction (indicated by an arrow) of movement of chart 20. Pens $P_2$ and $P_3$ are spaced apart from pen $P_1$ by predetermined distances, respectively. Platen 19a is rotated at a predetermined rotational speed set by CPU 59 through a chart feeding mechanism 61 which includes a pulse motor. The measurement signals applied to input terminals $Ti_1$-$Ti_3$, respectively, are amplified by preamplifiers $54_1$-$54_3$, respectively, and are applied to A/D converters $57_1$-$57_3$, respectively, to be converted into digital signals. In response to control signals transmitted through a photocoupler or optoisolator $62_4$ from CPU 59, A/D converters $57_1$-$57_3$ convert the analog signals into digital signals at a predetermined frequency independent of the feed rate of chart 20 and the output digital signals from A/D converter $57_1$-$57_3$ are applied through photocoupler $62_1$-$62_3$, respectively, to CPU 59, as the measurement data. Consequently, as the feed rate of chart 20 is slowed down, the number of data conversions is increased. On the other hand, when the feed rate of chart 20 is increased, the number of data conversions is decreased.

Measurement data from the system, associated with reference recording pen $P_1$, are sequentially applied through CPU 59 to a servo system $SL_1$ so that the real time recording of the measurement data is made by pen $P_1$. On the other hand, measurement data from the systems associated with pens $P_2$, $P_3$, are applied to CPU 59 so that a maximum value, a minimum value and an average value of each measurement data during one step of recording paper feed, are obtained and stored in memories $M_2$ and $M_3$. In response to the control signal from CPU 59, which is dependent on the set feed rate of chart 20, one or more data are selectively read out from memories $M_2$,$M_3$ and applied to servosystems $SL_2$, $SL_3$ at a timing which includes a predetermined time delay to compensate for phase difference with respect to reference recording pen $P_1$, and are recorded on chart 20 by pens $P_2$,$P_3$.

Figure 13:
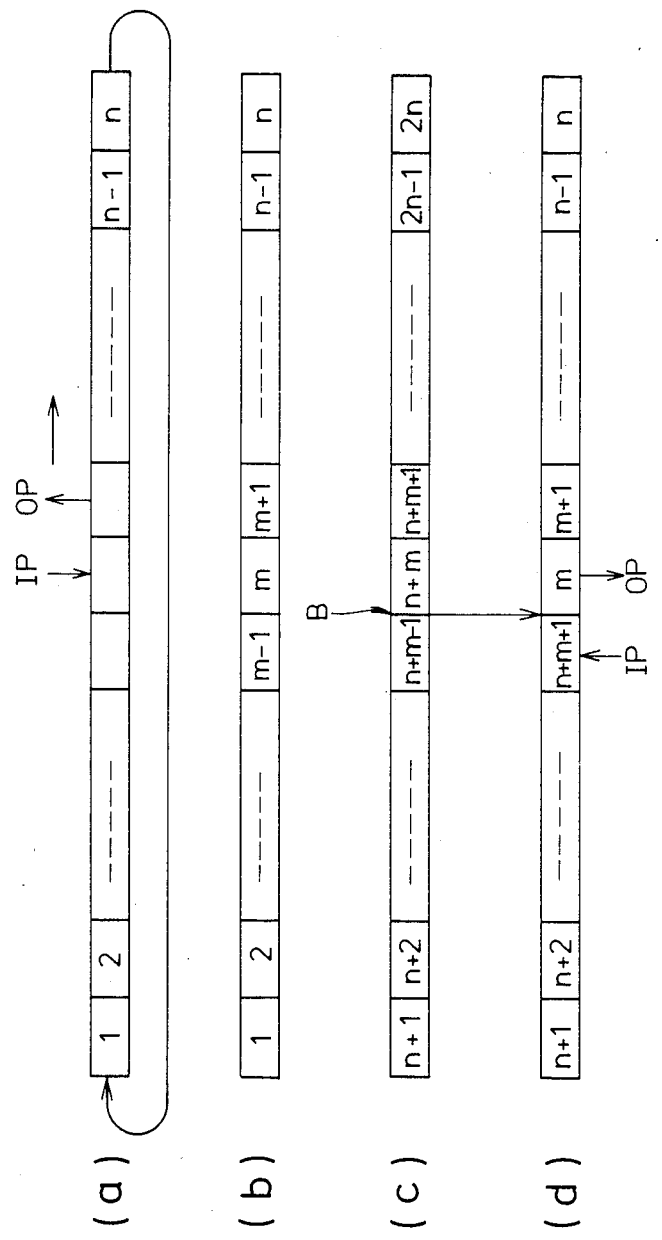
FIG. 13 is a diagram depicting a memory used in the three pen recorder of FIG. 12.

FIG. 13 shows the underlying principle of memories $M_2$,$M_3$ used FIG. 12. When there exists a phase difference corresponding to n steps in the direction of movement of chart 20 between the pens, a ring buffer capable of storing a number n of data, as shown in FIG. 13, line (a), is used and the input pointer IP and the output pointer OP, are caused to be shifted. The shifts of input pointer IP and output pointer OP are made each time chart 20 is moved one step in response to an interruption signal.

FIG. 13, line (b) shows data which are circulated once in the buffer. FIG. 13, line (c) shows data which are circulated twice in the buffer. FIG. 13, line (d) shows the contents of the buffer at a time B which is shown in FIG. 13, line (c).

It is seen from FIG. 13, line (d) that when the timing of the chart movement step is (n+m), data is derived at a timing m of the step of chart movement. That is, (n+m)−m=n, so that phase correction of n steps is carried out.

Figure 14:
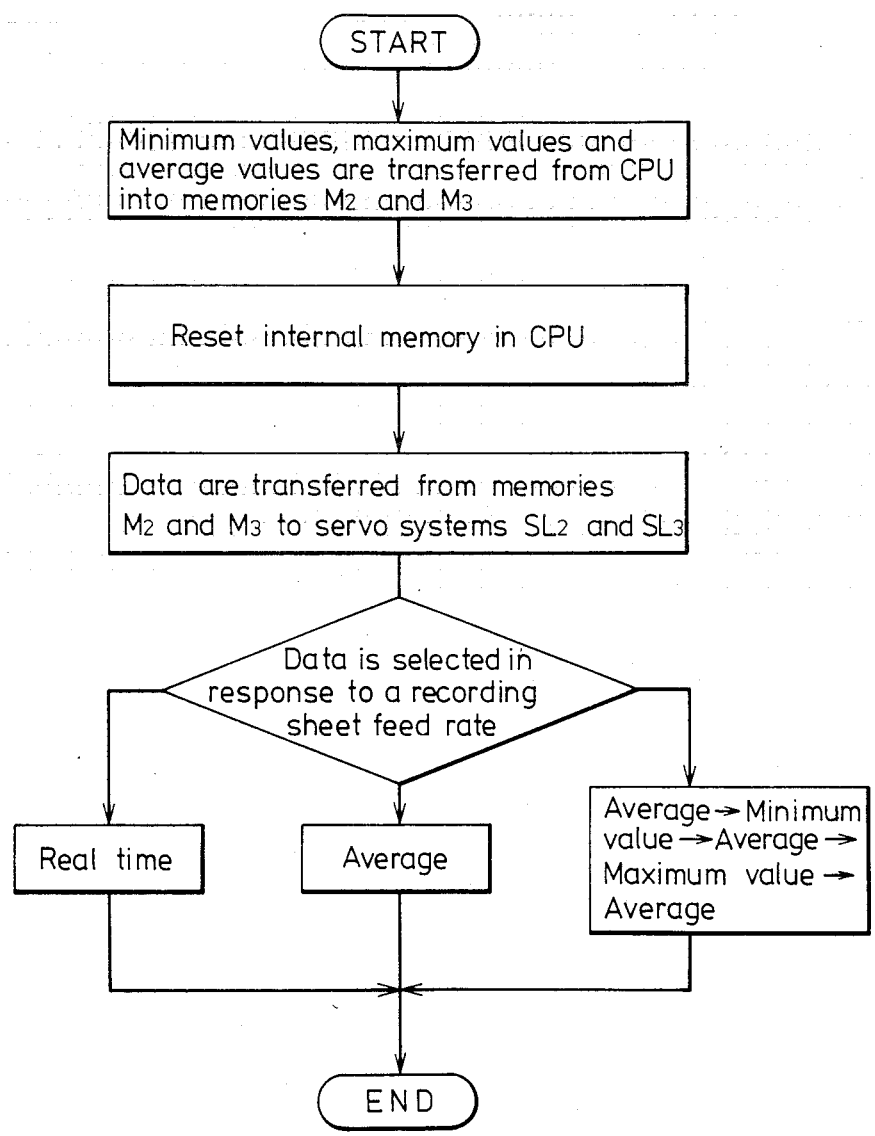
FIG. 14 is a flow chart depicting mode of operation of the recorder of FIG. 12.

Turning to FIG. 14, which shows the mode of operation of the recorder of FIG. 12, the most recent maximum value, minimum value and average value stored in a memory in CPU 59, are delivered to memories $M_2$ and M₃ so that the meory in CPU 59 is reset. Then, predetermined data are delivered from memories M₂ and M₃ to servosystems SL₂ and SL₃. In response to the feed rate of chart 20, either of the following is selectively delivered:

(i) a real time measurement data.
(ii) an average value, or
(iii) an average value—a minimum value—an average value—a maximum value—an average value.

For example, assme that the conversion frequency of A/D converters $57_1$–$57_3$ is 125 ms, and that the resolution of the feed rate of chart 20 is 0.1 mm (i.e. $0.05 \times 2$). Then, the relationship between feed rate x (at mm/hr) of chart 20 and number D of measurement data is obtained, as shown in FIG. 15.

FIG. 15 shows that when $2880 \leq X$, the measurement data becomes zero or one. When the data is zero, the measurement data is delivered at a preceding step, and when the data is one, the measurement data is delivered at real time. When $576 < X < 2880$, the measurement data becomes from one to five, so that an average value of measurement data is delivered. When 288 X=587 and X=72, the measurement data becomes more than five, so that an average value—a minimum value—a maximum value—an average value of the measurement data are delivered in the order named. As a result, the difference between the maximum and minimum values is recorded. The other data shown in FIG. 15 are self explanatory.

Measurement is always made at a predetermined frequency independent of the feed rate of chart 20. As a result, even when the feed rate of chart 20 is set at a slow rate, monitoring will not be adversely affected, as popposed to conventional pen recorders, and three recording lines corresponding to the magnitudes of the measurement signals are drawn by pens $P_1$–$P_3$ without any phase difference on chart 20. Although a three pen recorder has been described, the invention may be equally applied to a two pen recorder, or one having four or more pens.

As described, the measurement signals are converted into digital signals and applied to servosystems SL (see FIG. 12) under control of CPU 59. Thus, when a measurement signal in excess of an effective recording span is applied to the servosystem SL, the value of the measurement signal applied to servosystem SL is fixed to be an effective recording span under control of CPU 59, to prevent over run of pen carriage 29.

Figure 16:
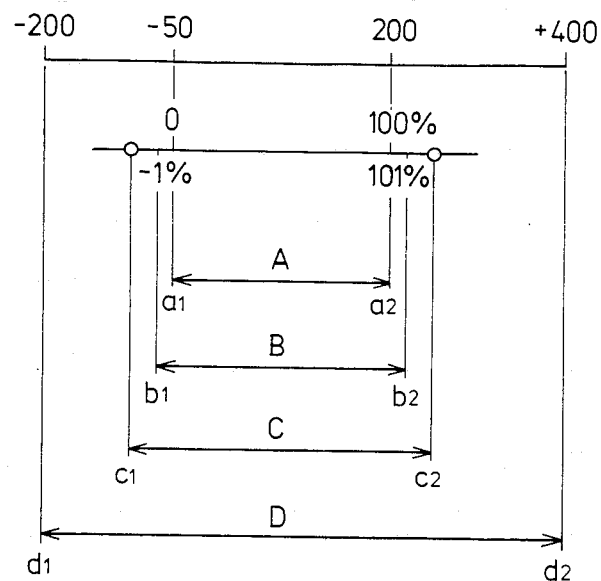
FIGS. 16A, 16B are charts depicting the mode of operation of the servo system of FIG. 11.
Figure 16:
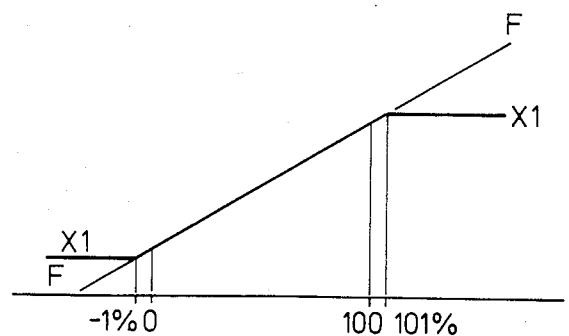

FIG. 16A shows various spans and ranges of movement of carriage 29 in the recorder of FIG. 11. A represents a recording span (0–100%). B represents an effective recording span (−1%–0%–101%). C represents the range of movement of carriage 29. D represents a measurable full span. b1 represents the lower limit of effective recording span. b2 represents the upper limit of effective recording span. These lower limits and upper limits are stored as digital data in a memory (not shown). c1, in movable range C of carriage 29, represents a mechanical stopper at 0%. c2 represents a mechanical stopper at 100%.

FIG. 16B shows the signal relationship of the servosystem. X1 represents the output of the D/A converter 60. F represents the feedback signal derived through potentiometer control circuit 31q.

Figure 17:
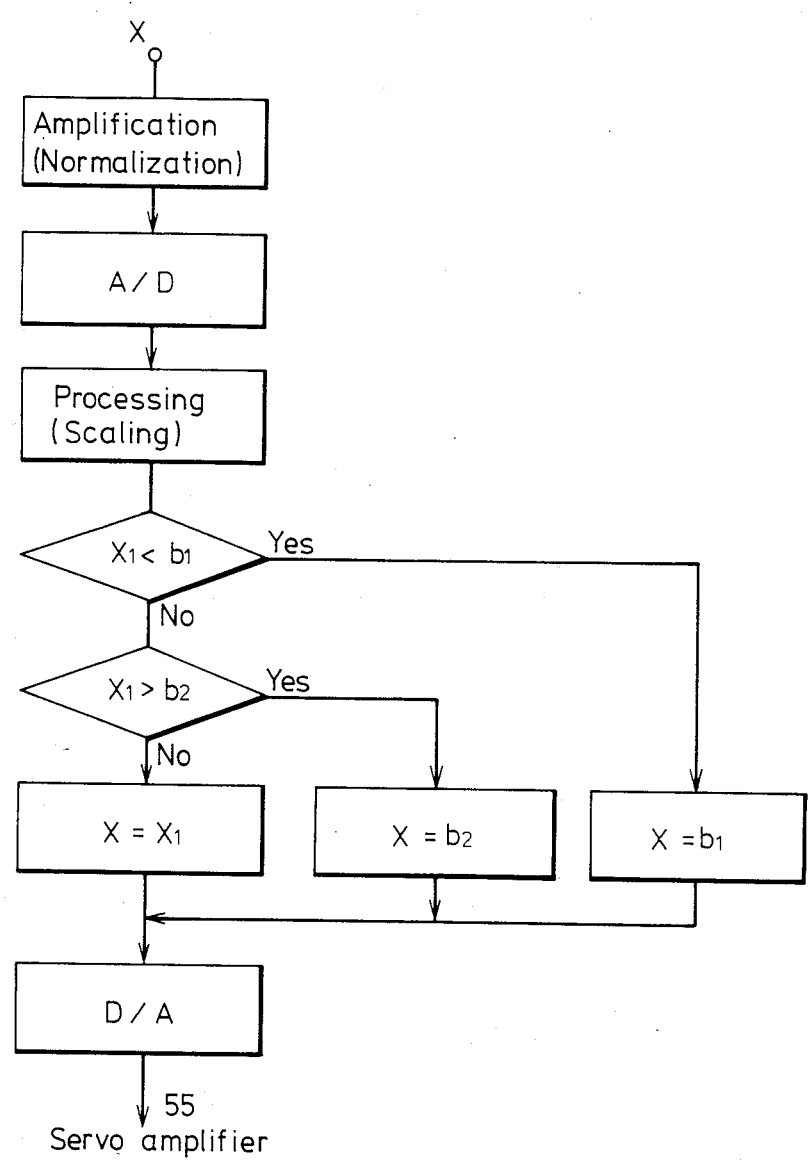
FIG. 17 is a flow chart depicting the mode of operation of the servo system of FIG. 11 in conjunction with the charts of FIGS. 16A,16B.

FIG. 17 shows a flow chart for explaining the mode of operation of FIG. 11. Measurement signal X is amplified and/or normalized by preamplifier 54 and is converted into a digital signal by A/D converter 57. The digital output signal from A/D converter 57 is applied to CPU 59 so that predetermined arithmetic operations, such as linearizing, scaling, etc, are carried out. The processed signal is converted into a display signal and a recording signal. The display signal is applied to display unit 21 so that its value is displayed. The recording signal is applied to D/A converter 60 to be converted into an analog signal X1. CPU 59 compares analog signal X1 with the lower and upper limits b1 and b2 (see FIG. 16A) of the effective span B.

When $b1 < X1 < b2$, or, if analog signal X1 applied to the servosystem is within the effective span B, analog signal X1 varies in response to the magnitude of measurement signal X. Analog signal X1 is applied through servoamplifier 55 to motor M and is compared with signal F derived from potentiometer 31. If measurement signal X is within effective recording span B as described above, the pen carried on carriage 29 records data representative of the magnitude of measurement signal X.

If $b1 > X1$ (i.e. under scale), CPU 59 restricts analog signal X1 applied to the servosystem to lower limit b1 regardless of the magnitude of measurement signal X. If $b2 < X1$ (i.e. over scale) CPU 59 restricts analog signal X1 applied to the servosystem to the upper limit b2. When the analog signal X1, applied to the servosystem, is restricted to the upper limit or the lower limit the servosystem is balanced at b1 or b2, as shown in FIG. 16B. Consequently, carriage 29 is stopped before it makes contact with mechanical stoppers disposed at c1 and c2 so that no impact force is applied to carriage 29. In addition, the servosystem is always maintained in a balanced state so that heat dissipation from motor M is reduced to a minimum and power consumption is decreased.

Figure 18:
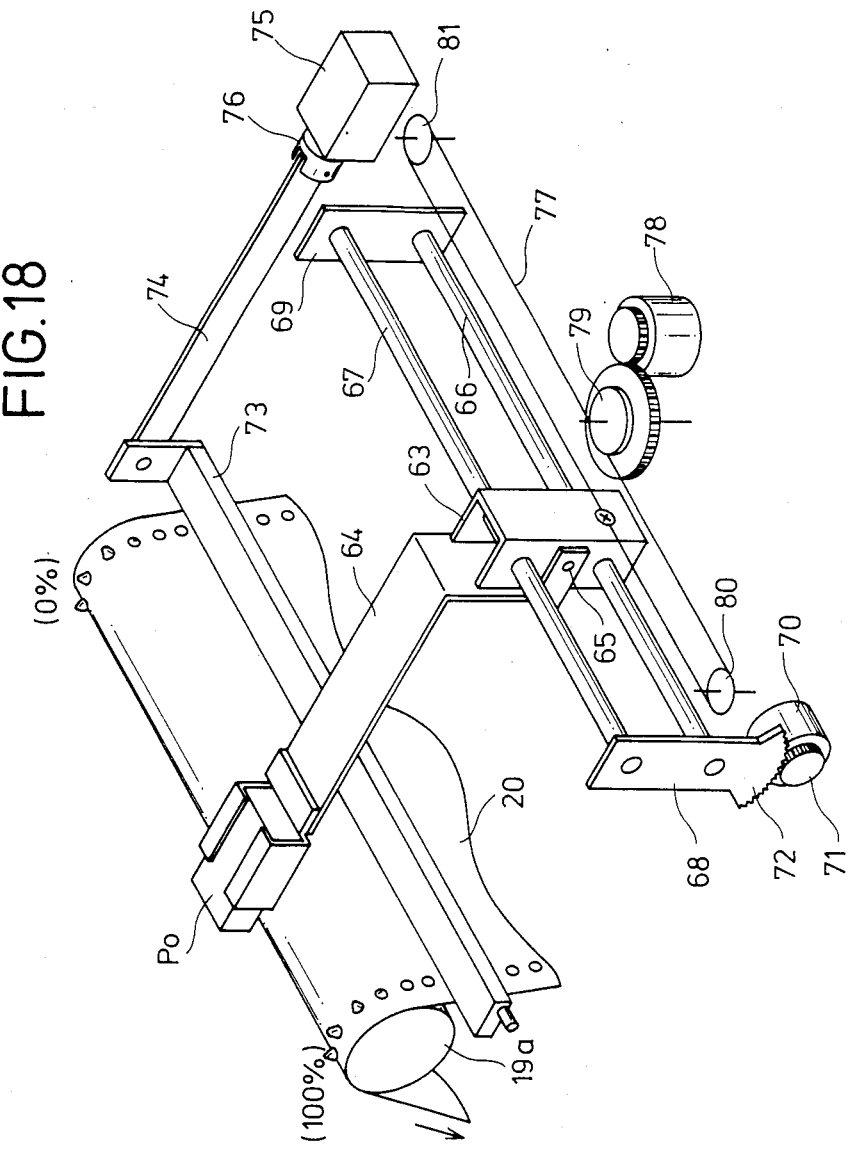
FIG. 18 is a perspective view depicting a printing mechanism used in the embodiment of FIG. 4.

FIG. 18 shows printing mechanism CP of FIG. 4 with carriage 63 being pivotally attached to one end of pen arm 64 with a shaft 65, which is slidably carried by a main shaft 66 and an auxiliary shaft 67. Both ends of main shaft 66 and auxiliary shaft 67 are securely fixed to side plates 68, 69. Main shaft 66 and auxiliary shaft 67 extend in parallel to each other. A lower end of side plate 68 is terminated into a sector gear meshed with a gear 71 carried by output shaft of motor 70, so that upon rotation of motor 70, side plate 68 is caused to rotate about main shaft 66. A driving plate 73 is provided for moving pen arm 64 in the vertical direction and is rotatably fixed to a side plate of a main body (not shown). Driving plate 73 is connected through a link 74 to plunger 76 of solenoid 75 so that driving plate 73 is rotatable. A driving string 77 is provided for displacing cariage 63 and is wrapped around a driving pulley 79, driven by motor 78, and around driven pulleys 80, and 81. Driving string 77 is securely fixed to carriage 63.

In operation, recorder chart 20 is continuously moved in a predetermined direction indicated by the unmarked arrow at a suitable speed ranging between 5 mm/hr and 12000 mm/hr. The magnitudes of the measurement signals are recorded over chart 20 in an analog manner by pens $P_1$–$P_3$ (as seen in FIG. 12) while pen $P_0$ records various data, such as feed rate of chart 20, date, time, alarm information, time markers, etc, on chart 20.

When printing is to be done by pen $P_0$, in response to printing signal, pen $P_0$ may be displaced in the direction of feed of chart 20, in a direction perpendicular to the direction of feed of chart 20, and/or in a direction perpendicular to chart 20. In order to move pen $P_0$ in the direction of feed of chart 20, motor 70 is energized so that pen arm 64 is caused to move forwardly or backwardly of platen 19a. In order to move pen P₀ in the direction perpendicular to the direction of feed of chart 20, motor 78 is energized so that driving string 77 causes carriage 63 to shift. In order to move pen P₀ in a direction perpendicular to recording chart 20, solenoid 75 is selectively energized so that driving plate 73 is rotated and consequently pen arm 64 is shifted.

Thus, while chart 20 is being continuously moved, a predetermined pattern is printed on chart 20, and depending on the feed rate of chart 20, the pattern is suitably inclined (that is as seen from the direction of movement of the chart and perpendicular to such chart movement direction). For example, assume that 20 characters are printed along one line and that the printing speed is two characters per second. Then, it takes 10 seconds to print one line. If the limit of the inclination of the recorded pattern is 2 mm for 100 mm, the limit of the feed rate of the chart 20 becomes 2 mm/10 sec=720 mm/hr. When the recorder is capable of setting the feed rate of chart 20 between 5 mm/hr and 12000 mm/hr, as described above, the printing may be carried out with a permissible inclination at a feed rate of between 5 mm/hr and 720 mm/hr.

In this embodiment, motors 70 and 78 are pulse motors having the same characteristics and capable of printing at a speed of about 5 cm/sec. with a resolution of 0.2 mm. Thus, motors 70 and 78 should be rest to their initial positions, respectively, after each cycle. To this end, mechanical stoppers may be provided and driving pulses are applied for a predetermined period of time so that the pulse motors are detuned and thereafter the motors are reset. Alternatively, switches may be provided so that in response to the contact signals, the pulse motors may be reset. In addition, an encoder may be directly connected to each pulse motor so that the initial position thereof may be determined. Thus, these motors 70,78 need be energized only during printing operation so that power consumption is reduced to a minimum and temperature rise in the recorder is suppressed, both being of great commercial advantage.

Although the potentiometer has been described to include a magnetorestrictive wire, it is to be understood that any other suitable potentiometer, such as an electrically conductive plastic, may be used. When the magnetorestrictive potentiometer is used, a driving coil and an output transformer are mounted on a pen carriage and a magnetorestrictive wire is provided with a detecting coil. A power supply is connected to the ends of said magnetorestrictive wire, whereby a wireless potentiometer may be provided. In this case, flexible printed circuit board 36 (shown in FIG. 7), may be eliminated. The invention, thus, has many advantages. High packing density in pen recorders is now possible, with the consequent reduction in size of such recorder. The invention is highly reliable and dependable in operation, is inexpensive to manufacture and easy to maintain. The invention can be applied to manufacture of a multi-pen recorder which has the same advantages.

The foregoing description is illustrative of the principles of the invention. Numerous modifications and extensions thereof would be apparent to the worker skilled in the art. All such modifications and extensions are to be considered to be within the spirit and scope of the invention.

What is claimed is:

1. A pen recorder comprising
a pen carriage;
an automatic balancing mechanism for moving said pen carriage in a direction perpendicular to direction of movement of a recording paper, in response to magnitude of a measurement signal;
wherein said pen carriage and said automatic balancing mechanism are integrally incorporated in a common printed circuit board constituting at least one servo unit.

2. The recorder of claim 1, wherein said servo unit comprises a flat type brushless DC motor comprising a disk shaped permanent magnet rotor whose magnetically neutral points and portions adjacent thereto at pole portions are substantially thin in dimensions, and a plurality of armature coils angularly spaced from each other by a predetermined angle in a circumferential direction.

3. The recorder of claim 1, wherein said servo unit comprises a magnetorestrictive potentiometer comprising a sheet like magnetorestrictive wire extending flatly in a direction parallel with direction of movement of said pen carriage.

4. The recorder of claim 1, further comprising a driving pulley and a driving string, said driving string being wrapped around said driving pulley for causing reciprocal movement of said pen carriage, said driving pulley having an internally threaded gear teeth for transmitting rotating output of a servomotor.

5. The recorder of claim 1, wherein said measurement signal is converted into a digital signal which is applied to a servosystem under control of a microprocessor.

6. The recorder of claim 4, wherein said measurement signal, in excess of an effective recording span, is applied to a servosystem, and wherein the value of said measurement signal being applied to said servosystem is restricted to the magnitude of said effective recording span, under control of a microprocessor.

7. The recorder of claim 1, further comprising a bar graph display device for displaying magnitude of said measurement signal to be recorded by said servo unit in the form of a bar graph.

8. The recorder of claim 1, wherein magnitudes of a plurality of said measurement signals are recorded in an analog manner and in different colors by a plurality of said servo units; and wherein said magnitudes of each said measuring signal to be recorded by each said servo unit, is displayed by a bar graph display device, in the form of a bar graph in the same color as the color of said recorded magnitude of each said measurement signal.

9. The recorder of claim 1, wherein magnitudes of said measurement signals derived from a plurality of systems are converted into digital signals at a predetermined frequency, independent of feed rate of said recording chart, and are applied to respective servosystems under control of a microprocessor and recorded with a time difference corresponding to spacing or distance between pens of respective servosystems being corrected.

10. The recorder of claim 1, further comprising a printing mechanism having a pen, said pen being displaced in a direction of feed of said chart, and/or in a direction perpendicular to direction of feed of said chart, and/or in a direction perpendicular to said recording chart, in response to a printing signal, thereby to print a predetermined pattern on said chart.

* * * * *